US007927703B2

(12) United States Patent
Xia et al.

(10) Patent No.: US 7,927,703 B2
(45) Date of Patent: Apr. 19, 2011

(54) ADHESIVE BLENDS, ARTICLES, AND METHODS

(75) Inventors: Jianhui Xia, Woodbury, MN (US);
Ying-Yuh Lu, Woodbury, MN (US);
Zhiming Zhou, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/411,933

(22) Filed: Apr. 11, 2003

(65) Prior Publication Data
US 2004/0202879 A1 Oct. 14, 2004

(51) Int. Cl.
B32B 27/08 (2006.01)
B32B 7/12 (2006.01)
C08L 33/06 (2006.01)

(52) U.S. Cl. ........ 428/412; 428/500; 428/515; 525/228; 156/327; 156/332

(58) Field of Classification Search .................. 428/412, 428/514, 516, 500, 523, 515; 525/222, 55, 525/228; 156/331, 327, 332
See application file for complete search history.

(56) References Cited

U.S. PATENT DOCUMENTS

| | | | |
|---|---|---|---|
| 2,807,597 A | 9/1957 | Sonnenfeld et al. | 260/29.7 |
| 2,921,043 A | 1/1960 | Uraneck | 260/45.5 |
| 2,952,043 A | 9/1960 | Uraneck et al. | 18/57 |
| RE24,906 E | 12/1960 | Ulrich | 206/59 |
| 3,028,258 A | 4/1962 | Rice | 117/64 |
| 3,180,857 A | 4/1965 | Conciatori et al. | 260/883 |
| 3,236,914 A | 2/1966 | Murdock et al. | 260/857 |
| 3,574,153 A | 4/1971 | Sirota | 260/8 |
| 3,718,712 A | 2/1973 | Tushaus | 260/858 |
| 3,776,805 A | 12/1973 | Hansen | 161/2 |
| 3,914,017 A | 10/1975 | Bedell et al. | 350/154 |
| 3,925,282 A | 12/1975 | Davis et al. | 260/23 |
| 4,018,733 A | 4/1977 | Lopez et al. | 260/27 |
| 4,045,517 A | 8/1977 | Guerin | 260/901 |
| 4,152,189 A | 5/1979 | Guerin et al. | 156/331 |
| 4,156,035 A | 5/1979 | Tsao et al. | 427/44 |
| 4,243,500 A | 1/1981 | Glennon | |
| 4,261,649 A * | 4/1981 | Richard | 359/614 |
| 4,354,008 A | 10/1982 | Skoultchi | 525/370 |
| 4,360,638 A | 11/1982 | Bartman | 524/286 |
| 4,404,246 A | 9/1983 | Charbonneau et al. | 428/212 |
| 4,423,182 A | 12/1983 | Bartman | 524/367 |
| 4,500,683 A | 2/1985 | Hori et al. | 524/533 |
| 4,551,388 A | 11/1985 | Schlademau | 428/355 |
| 4,554,324 A | 11/1985 | Husman et al. | 525/301 |
| 4,585,820 A | 4/1986 | Defago et al. | 524/232 |
| 4,619,979 A | 10/1986 | Kotnour et al. | 526/88 |
| 4,396,675 A | 11/1986 | Groff | 428/355 |
| 4,728,571 A | 3/1988 | Clemens et al. | 528/352 |
| 4,737,559 A | 4/1988 | Kellen et al. | 526/291 |
| 4,832,984 A | 5/1989 | Hasegawa et al. | 427/161 |
| 4,833,179 A | 5/1989 | Young et al. | 522/183 |
| 4,843,134 A | 6/1989 | Kotnour et al. | 526/318 |
| 4,851,278 A | 7/1989 | Enznoza | 428/195 |
| 4,912,169 A | 3/1990 | Whitmire et al. | 525/221 |
| 5,006,582 A | 4/1991 | Mancinelli | 524/271 |
| 5,011,560 A | 4/1991 | Nakai et al. | 156/273 |
| 5,086,086 A | 2/1992 | Brown-Wensley et al. | 522/25 |
| 5,086,088 A | 2/1992 | Kitano et al. | 522/170 |
| 5,151,454 A | 9/1992 | Goto et al. | 522/93 |
| 5,154,962 A | 10/1992 | Mertens et al. | 428/40 |
| 5,187,235 A | 2/1993 | Bordoloi et al. | 525/305 |
| 5,190,997 A * | 3/1993 | Lindemann et al. | 524/44 |
| 5,209,971 A | 5/1993 | Babu et al. | 428/343 |
| 5,225,470 A | 7/1993 | Mancinelli | 524/271 |
| 5,252,662 A | 10/1993 | Su et al. | 524/549 |
| 5,252,694 A | 10/1993 | Willett et al. | 525/404 |
| 5,328,958 A | 7/1994 | Guo et al. | 525/187 |
| 5,344,681 A | 9/1994 | Calhoun et al. | 428/42 |
| 5,360,659 A | 11/1994 | Arends et al. | 428/216 |
| 5,369,141 A | 11/1994 | Coleman et al. | 523/106 |
| 5,378,758 A | 1/1995 | Amici et al. | 525/57 |
| 5,380,779 A * | 1/1995 | D'Haese | 524/272 |
| 5,384,341 A | 1/1995 | Itagaki et al. | 522/111 |
| 5,387,667 A | 2/1995 | Markle et al. | 528/374 |
| 5,416,127 A | 5/1995 | Chandran et al. | 522/149 |
| 5,460,880 A * | 10/1995 | Patnode et al. | 428/354 |
| 5,462,797 A | 10/1995 | Williams et al. | 428/345 |
| 5,475,038 A | 12/1995 | Skoultchi | 522/96 |
| 5,525,375 A | 6/1996 | Wang et al. | 427/391 |
| 5,545,826 A | 8/1996 | Amici et al. | 525/57 |
| 5,552,451 A | 9/1996 | Everaerts et al. | 522/46 |
| 5,567,768 A | 10/1996 | Amici et al. | 525/57 |
| 5,567,773 A | 10/1996 | McGee et al. | 525/221 |

(Continued)

FOREIGN PATENT DOCUMENTS

CN 1085234 4/1994

(Continued)

OTHER PUBLICATIONS

Product Literature: degussa. creating essentials, "Specifications and test methods for EUDRAGIT® E 100, EUDRAGIT® E PO and EUDRAGIT® E 12,5", Sep. 2004, (4 pages). 1983 Annual Book of ASTM Standards; ASTM Designation E 96-80, "Standard Test Methods for Water Vapor Transmission of Materials"; pp. 682-691.
1992 Annual Book of ASTM Standards; ASTM Designation D 3330-90, "Standard Test Methods for Peel Adhesion of Pressure-Sensitive Tape at 180° Angle"; pp. 485-488.
Annual Book of ASTM Standards (Section 8) Plastics; ASTM Designation D1003-95, "Standard Test Method for Haze and Luminous Transmittance of Transparent Plastics"; pp. 197-201.
Bartman; "High Performance Acrylic Hot Melt Pressure Sensitive Adhesives"; 1983 Paper Synthetics Conference; Sep. 26-28, 1983; pp. 169-172.
Beaulieu et al.; "Recent advances in acrylic hot-melt, pressure-sensitive adhesive technology"; Tappi Journal; Sep. 1984; vol. 67, No. 9; pp. 102-105.
Mancinelli; "Advancements in Acrylic HMPSA'S Via Block Copolymer Technology"; 1989 Polymers, Laminations and Coatings Conference; Sep. 5-8; pp. 679-683.

(Continued)

*Primary Examiner* — James Seidleck
*Assistant Examiner* — Saira Haider (57) ABSTRACT

Described are adhesive compositions containing a mixture of a pressure sensitive adhesive, a high Tg polymer, and a crosslinker to form a compatibilized blend that is optically clear. Methods of using the adhesive compositions, and multilayer assemblies such as optical elements prepared using the adhesives, are also provided.

18 Claims, 1 Drawing Sheet

U.S. PATENT DOCUMENTS

| | | | |
|---|---|---|---|
| 5,578,657 A | 11/1996 | Inoue et al. | 522/92 |
| 5,593,759 A | 1/1997 | Vargas et al. | 428/200 |
| 5,599,872 A | 2/1997 | Sulewski | 524/522 |
| 5,612,136 A * | 3/1997 | Everaerts et al. | 428/355 AK |
| 5,637,646 A | 6/1997 | Ellis | 525/309 |
| 5,641,835 A | 6/1997 | Smith et al. | 525/102 |
| 5,652,305 A | 7/1997 | Amici et al. | 525/57 |
| 5,666,223 A | 9/1997 | Bennett et al. | 359/490 |
| 5,668,198 A | 9/1997 | Suhadolnik et al. | 524/99 |
| 5,668,199 A | 9/1997 | Suhadolnik et al. | 524/99 |
| 5,679,794 A | 10/1997 | Suhadoonik et al. | 546/186 |
| 5,721,289 A | 2/1998 | Karim et al. | 522/31 |
| 5,747,145 A | 5/1998 | Sorriero et al. | 428/195 |
| 5,773,485 A | 6/1998 | Bennett et al. | 522/8 |
| 5,776,649 A | 7/1998 | Sorriero et al. | 430/126 |
| 5,858,624 A | 1/1999 | Chou et al. | 430/371 |
| 5,861,211 A | 1/1999 | Thakkar et al. | 428/343 |
| 5,883,148 A | 3/1999 | Lewandowski et al. | 522/95 |
| 5,895,801 A | 4/1999 | Lee | 525/301 |
| 5,897,727 A | 4/1999 | Staral et al. | 156/99 |
| 5,905,099 A | 5/1999 | Everaerts et al. | 522/126 |
| 5,955,512 A | 9/1999 | Numazawa et al. | 522/95 |
| 5,959,775 A | 9/1999 | Joseph et al. | 359/538 |
| 5,967,635 A | 10/1999 | Tani et al. | |
| 5,989,778 A | 11/1999 | Hozumi | 430/281 |
| 6,013,722 A | 1/2000 | Yang et al. | 524/558 |
| 6,017,603 A | 1/2000 | Tokuda et al. | 428/64 |
| 6,042,943 A | 3/2000 | Levy | 428/378 |
| 6,049,419 A | 4/2000 | Wheatley et al. | 359/359 |
| 6,088,079 A | 7/2000 | Kameyama et al. | 349/185 |
| 6,146,756 A | 11/2000 | Ausen et al. | 428/336 |
| 6,166,212 A | 12/2000 | Galbo et al. | 546/216 |
| 6,180,200 B1 | 1/2001 | Ha et al. | 428/64.1 |
| 6,194,317 B1 | 2/2001 | Kaisaki et al. | 438/692 |
| 6,277,485 B1 | 8/2001 | Invie et al. | 428/336 |
| 6,319,603 B1 | 11/2001 | Komiya et al. | 428/378 |
| 6,423,392 B1 | 7/2002 | Koch et al. | 428/42.3 |
| 6,448,339 B1 * | 9/2002 | Tomita | 525/217 |
| 6,465,645 B1 | 10/2002 | Wood et al. | 544/198 |
| 6,523,962 B2 | 2/2003 | Yajima | |
| 6,645,617 B1 * | 11/2003 | Okazaki et al. | 428/343 |
| 6,764,804 B2 | 7/2004 | Bourdelais et al. | 430/201 |
| 6,872,653 B2 | 3/2005 | Fujii | |
| 2001/0025083 A1 * | 9/2001 | Stark et al. | 525/222 |
| 2003/0192638 A1 * | 10/2003 | Yang et al. | 156/230 |
| 2004/0105078 A1 | 6/2004 | Akiya | |
| 2004/0126576 A1 | 7/2004 | Kinning et al. | 428/352 |
| 2004/0127121 A1 | 7/2004 | Schwab et al. | 442/46 |
| 2006/0062809 A1 | 3/2006 | Six et al. | |

FOREIGN PATENT DOCUMENTS

| | | |
|---|---|---|
| DE | 44 29 791 A1 | 2/1996 |
| EP | 0 375 447 | 6/1990 |
| EP | 0 484 093 B1 | 5/1992 |
| EP | 0 578 082 A2 | 1/1994 |
| EP | 0 729 494 B1 | 9/1996 |
| EP | 1 142 912 A1 | 10/2001 |
| EP | 1 375 617 A1 | 1/2004 |
| EP | 1 375 618 A1 | 1/2004 |
| GB | 1 550 382 | 8/1979 |
| JP | 50-139135 | 11/1975 |
| JP | 51-19035 | 2/1976 |
| JP | 54088938 | 7/1979 |
| JP | 60-176663 | 9/1985 |
| JP | 2-178380 | 7/1990 |
| JP | 6-89462 | 3/1994 |
| JP | 6-140090 | 5/1994 |
| JP | 9-87601 | 3/1997 |
| JP | 9-113724 | 5/1997 |
| JP | 10-1659 | 1/1998 |
| JP | 10-25453 | 1/1998 |
| JP | 10-46109 | 2/1998 |
| JP | 10-120994 | 5/1998 |
| JP | 10-140090 | 5/1998 |
| JP | 10-310754 | 11/1998 |
| JP | 11-164878 | 6/1999 |
| JP | 2001-89731 | 4/2001 |
| JP | 2002-327160 | 11/2002 |
| WO | WO 84/03837 A1 | 10/1984 |
| WO | WO 87/00190 A1 | 1/1987 |
| WO | WO 94/13749 A1 | 6/1994 |
| WO | WO 95/13328 A1 | 5/1995 |
| WO | WO 96/05813 A1 | 2/1996 |
| WO | WO 96/07522 A1 | 3/1996 |
| WO | WO 97/33945 | 9/1997 |
| WO | WO 98/03208 A1 | 1/1998 |
| WO | WO 98/36325 A1 | 8/1998 |
| WO | WO 98/51754 | 11/1998 |
| WO | WO 99/42536 | 8/1999 |
| WO | WO 00/32710 * | 6/2000 |
| WO | WO 00/61693 A1 | 10/2000 |
| WO | WO 01/72918 A1 | 10/2001 |
| WO | WO 02/06413 A1 | 1/2002 |
| WO | WO 02/086623 A1 | 10/2002 |

OTHER PUBLICATIONS

Rauwendaal; "Mixing in Single-Screw Extruders"; Mixing in Polymer Processing; 1991; pp. 129, 176-177, 184-187.

Sanderson et al.; "Acrylic Hot Melt Pressure Sensitive Adhesives: Emerging Technology for the 80's"; 1980 TAPPI Hot Melt Short Course Notes; Jun. 1-4, 1980; pp. 39-60.

Sparks; "Advances in Hot Melt and Waterborne Acrylic PSAs"; Adhesives Age; Mar. 1982; vol. 25, No. 3; pp. 38-44.

* cited by examiner

ADHESIVE BLENDS, ARTICLES, AND METHODS

FIELD OF THE INVENTION

The invention relates to adhesive compositions. In particular, the invention relates to pressure sensitive adhesive compositions, methods of using such adhesives, and articles prepared using the adhesives, such as optical products.

BACKGROUND

Pressure sensitive adhesives have significant commercial application. While a variety of adhesives have been prepared from countless combinations of ingredients including various polymers, e.g., acrylates, (meth)acrylates; epoxies; crosslinkers; heat and cationically curable polymers; and heat or radiation sensitive initiators; not all such compositions are suitable for use, especially in optical applications where clarity and stability are required. A useful adhesive for optical applications should be optically clear, and should also maintain that clarity over the life of the product in which it is used. The adhesive should withstand conditions present during manufacturing of optical elements and during use of such elements without losing a substantial amount of clarity. This property involves the adhesive being stable on its own, and also being stable and compatible when used with other elements in an optical element or optical product.

Optical elements include components bonded together by the adhesive. The adhesives are used, for example, to bond materials to polymeric materials such as polyesters; to bond materials to rigid materials such as rigid polycarbonate, polymethyl methacrylate, or glass; to bond materials to polarizer layers; etc.

Often, any of these components of an optical element, can adversely affect the stability, clarity, bond strength, or other performance property of an adhesive in the same optical element. Polycarbonates, for example, are known to outgas in response to changing environmental conditions such as heat and humidity, producing bubbles or partial or full delamination at the adhesive bond between the polycarbonate and another layer of an optical element. Bubbling and delamination can be particularly common when the outgassing layer is bonded to another layer or laminate that exhibits low vapor transmissivity. Bubbles and delamination can affect clarity and integrity of the optical element, and should be avoided. It can be preferred, therefore, in these and other settings, that an adhesive be stable and not delaminate, bubble, or lose its clarity or integrity during use.

SUMMARY OF THE INVENTION

The present invention relates to adhesive compositions comprising a majority of pressure sensitive adhesive, a polymer with a high glass transition temperature (Tg), and a crosslinker. Exemplary embodiments of the compositions can have useful optical transmissivity, e.g., be optically clear, and can remain substantially optically clear for a period of a useful product lifetime.

An aspect of the invention relates to an adhesive composition. The adhesive composition includes: at least one polymer with either an acid or base functionality that forms a pressure sensitive adhesive, a high Tg polymer with an weight average molecular weight greater than 100,000 with an acid or base functionality, and a crosslinker, wherein the functionality on the pressure sensitive adhesive and the high Tg polymer cause an acid-base interaction that forms a compatibilized blend. After accelerated aging of the adhesive composition at 80° C. and 90% relative humidity for approximately 500 hours in an oven, the adhesive mixture is translucent or optically clear.

In an alternate embodiment, the adhesive composition includes a majority of a pressure sensitive adhesive component comprising at least one polymer with an acid functionality, a high Tg polymer comprising a base functionality imparted by an amide group, and a crosslinker; wherein the functionality of the pressure sensitive adhesive and the functionality of the high Tg polymer form an acid-base interaction when mixed; and wherein the pressure sensitive adhesive component is free of alkoxy (meth)acrylates.

In another embodiment, the adhesive composition includes a majority of a pressure sensitive adhesive component comprising at least one polymer with a base functionality, a high Tg polymer comprising an acid functionality, and a crosslinker; wherein the functionality of the pressure sensitive adhesive and the functionality of the high Tg polymer form an acid-base interaction when mixed.

The present invention further relates to methods of using the adhesives, for example by coating the adhesive on a substrate, such as a release liner or an optical film. Additional steps of inventive methods may include placement of the adhesive onto a release liner; optional drying of an optional solvent in the adhesive or polymerization; or other steps, techniques, or methods known in the preparation of optical elements using an adhesive.

Another aspect of the invention relates to a multi-layer assembly that includes the optically clear adhesive composition, and the assembly optionally includes a low moisture vapor transfer layer and/or an outgassing layer adhered to the adhesive composition.

Another aspect of the invention relates to a method of preparing a multi-layer article. The method includes coating onto a substrate an adhesive composition comprising at least one polymer with either an acid or base functionality that forms a pressure sensitive adhesive, a high Tg polymer with an weight average molecular weight greater than 100,000 with an acid or base functionality, and a crosslinker, wherein the functionality on the pressure sensitive adhesive and the high Tg polymer cause an acid-base interaction that forms a compatibilized blend; optionally drying the adhesive composition mixture to remove optional solvent; and laminating the coated adhesive composition onto another substrate.

BRIEF DESCRIPTION OF THE DRAWINGS

All figures are not drawn to scale.

DETAILED DESCRIPTION

The present invention contemplates specific compatibilized compositions that comprise: a majority of a pressure sensitive adhesive component, a high Tg polymer, and a crosslinker. As used herein the term "compatibilized" means that materials making up the adhesive composition form a stable multiphase morphology wherein the phases do not significantly coalesce and/or increase in size upon aging at temperatures at or above the glass transition temperature (Tg) of the materials. As used herein, high Tg polymer means a polymer with a glass transition temperature higher than polymers used to form a pressure sensitive adhesive, e.g., temperatures typically exceeding 20° C.

Pressure sensitive adhesives (PSAs) are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are one example of a preferred adhesive blend in accordance with the present invention. The compatibilized blend formed from the mixture of PSA component and high Tg polymer of the present invention is optionally also a pressure sensitive adhesive composition. Alternatively, the adhesive composition can be a laminating (heat-activated) adhesive.

"Polymer" refers to macromolecular materials having at least five repeating monomeric units, which may or may not be the same. The term polymer, as used herein, encompasses homopolymers and copolymers.

The PSA component and the high Tg polymer are compatibilized using a compatibilization scheme. As used herein the term "compatibilization scheme" refers to the method by which the PSA component and the high Tg polymer are made to be compatible with one another due to a modification of their interfacial interactions. The compatibilization scheme comprises functionalizing at least one polymer in the PSA and the high Tg polymer in such a way that an acid-base interaction is present between the two materials. The acid-base interaction that is present between the polymers described herein may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

$$A(\text{acid}) + :B(\text{base}) \rightarrow A:B(\text{acid-base complex}).$$

The acid-base interactions between the polymer in the PSA and the high Tg polymer reduce their interfacial tension leading to a reduction in the dispersed phase particle size, and a stabilization of the multiphase morphology. The interfacial tension between the materials reduces the domain size of the high Tg polymer. In some embodiments, particularly those in optical applications, the domain size of the high Tg polymer dispersed within the pressure sensitive adhesive is less than the wavelength of light to produce optical clarity. In some embodiments the domain size of the high Tg polymer is less than 100 nanometers. In other embodiments, the domain size of the high Tg polymer is less than 50 nanometers.

The compatibilized scheme is independent of the particular functionality on the respective polymer. That is, either the PSA component or the high Tg polymer can contain the acid or the base functionality. For example, an acid functionalized polymer in the PSA component can be paired with a base functionalized high Tg polymer. Alternatively, a base functionalized polymer of the PSA component can be paired with an acid functionalized high Tg polymer.

Acrylate and methacrylate monomers are referred to collectively herein as "(meth)acrylate" monomers. (Meth)acrylate polymers may be of copolymers, optionally in combination with other, non-(meth)acrylate, e.g., vinyl-unsaturated, monomers. Such polymers and their monomers are well-known in the polymer and adhesive arts, as are methods of preparing the monomers and polymers. One of skill will understand and recognize that such polymers can be useful to impart adhesive properties, and will understand their use in providing an adhesive as described herein.

As used in the present invention, an "acidic copolymer" is a polymer that is derived from at least one acidic monomer and at least one non-acidic copolymerizable monomer (i.e., a monomer that can not be titrated with a base). In one embodiment, at least one copolymerizable monomer is a (meth)acrylate monomer such as an alkyl (meth)acrylate monomer. The acidic copolymer may optionally be derived from other copolymerizable monomers, such as vinyl monomers and basic monomers, as long as the resultant copolymer can still be titrated with a base. Thus, usually more acidic monomers are utilized to prepare the acidic copolymers than basic monomers.

A "basic copolymer" is a polymer that is derived from at least one basic monomer and at least one nonbasic copolymerizable monomer (i.e., a monomer that cannot be titrated with an acid). Other monomers can be copolymerized with the basic monomers (e.g., acidic monomers, vinyl monomers, and (meth)acrylate monomers), as long as the basic copolymer retains its basicity (i.e., it can still be titrated with an acid). In one embodiment, at least one copolymerizable monomer is a (meth)acrylate monomer such as an alkyl (meth)acrylate monomer.

The adhesive compositions of the present invention, being optically clear, can be used to make a variety of useful products, especially products that benefit from an optically transmissive adhesive such as optical elements and optical products. Optical elements typically include a number of layers of different substrate materials, which can be any one or more of polymeric, glass, metallized polymer, or of the present adhesive or another adhesive, e.g., another pressure sensitive or structural adhesive. Any one or more of these materials may be flexible, rigid, reflective, antireflective, polarizing, and is typically sufficiently optically transmissive to function as a component of the optical element.

Some materials used in optical products may have particular physical or chemical properties that can create adverse effects within the optical product. As an example, some materials may outgas, compromising an adhesive bond if the outgassing affects the adhesive and adhesion. Some materials may be low in their ability to transmit moisture vapor, possibly exacerbating the effects of the outgassing layer on an intervening adhesive. The adhesives described herein can be useful, because the adhesives can be optically transmissive to resist combined effects such as outgassing and low moisture vapor transfer.

Thus, the invention includes the use of the described adhesive for any application, especially applications within optical products or optical elements, and especially to bond materials where an optically transmissive or clear adhesive is useful, required, or desired. The invention is particularly useful for bonding materials that tend to outgas, and where such outgassing tends to compromise integrity of an adhesive bond between the outgassing material and another material. Even more specifically, the invention contemplates bonding an outgassing material to a material that has a low moisture vapor transfer rate.

Pressure Sensitive Adhesive Component

The pressure sensitive adhesive component of the adhesive composition in the present invention comprise either an acidic or basic copolymer. When the PSA component comprises an acidic copolymer, the ratio of acidic monomers to non-acidic copolymerizable monomers utilized varies depending on desired properties of the resulting adhesive. The properties of the adhesive can also be adjusted by varying the amount of the acidic copolymer in the compatibilized blend of PSA component, high Tg polymer, and a crosslinker.

Generally, as the proportion of acidic monomers used in preparing the acidic copolymer increases, cohesive strength of the resulting adhesive increases. The proportion of acidic monomers is usually adjusted depending on the proportion of acidic copolymer present in the blends of the present invention.

To achieve pressure sensitive adhesive characteristics, the corresponding copolymer can be tailored to have a resultant glass transition temperature (Tg) of less than about 0° C. Particularly preferred pressure-sensitive adhesive copolymers are (meth)acrylate copolymers. Such copolymers typically are derived from monomers comprising about 40% by weight to about 98% by weight, preferably at least 70% by weight, more preferably at least 85% by weight, most preferably about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0° C.

In some embodiments, it is desirable to use (meth)acryalte monomers that are free of alkoxy groups.

When used, basic (meth)acrylate copolymers useful as the pressure sensitive adhesive component typically are derived from basic monomers comprising about 2% by weight to about 50% by weight, preferably about 5% by weight to about 30% by weight, of a copolymerizable basic monomer.

When used to form the pressure sensitive adhesive component, acidic (meth)acrylate copolymers typically are derived from acidic monomers comprising about 2% by weight to about 30% by weight, preferably about 2% by weight to about 15% by weight, of a copolymerizable acidic monomer.

High Tg Polymer Additive

The high Tg polymer additive of the present invention comprise either an acidic or basic copolymer, depending on the functionality chosen for the pressure sensitive adhesive. For example, if the pressure sensitive adhesive comprises an acidic copolymer, then the high Tg polymer additive will be a basic copolymer to form a compatibilized blend.

To achieve the high Tg characteristics of the polymer additive, the corresponding copolymer is tailored to have a resultant glass transition temperature (Tg) of greater than about 20° C. In some embodiments, the Tg of the high Tg polymer additive is greater than 40° C., 50° C., or 60° C. In exemplary embodiments, the copolymers are (meth)acrylate copolymers. Such copolymers typically are derived from monomers comprising about 40% by weight to about 98% by weight, preferably at least 70% by weight, more preferably at least 85% by weight, most preferably about 90% by weight, of at least one alkyl (meth)acrylate monomer that, as a homopolymer, has a Tg of greater that about 20° C. Examples include vinyl monomers and alkyl (meth)acrylate monomers which, as homopolymers, have a Tg greater than 20° C., such as n-butyl methacrylate, methyl methacrylate, isobornyl acrylate, vinyl acetate, styrene, and the like.

Alkyl (meth)acrylate monomers with a Tg less than 0° C., such as monomers with alkyl groups comprising from about 4 carbon atoms to about 12 carbon atoms, including n-butyl acrylate, 2-ethylhexyl acrylate, isooctyl acrylate, isononyl acrylate, isodecyl acrylate, and mixtures thereof, may be utilized in conjunction with one or more of the high Tg alkyl (meth)acrylate monomers and copolymerizable basic or acidic monomers, provided that the Tg of the resultant (meth)acrylate copolymer is greater than about 20° C.

When the high Tg polymer additive is a basic copolymer, it is typically a basic (meth)acrylate copolymer. Basic (meth)acrylate copolymers typically are derived from basic monomers comprising about 2% by weight to about 50% by weight, preferably about 5% by weight to about 30% by weight, of a copolymerizable basic monomer.

When the high Tg polymer additive is an acidic copolymer, it is typically an acidic (meth)acrylate copolymer. Acidic (meth)acrylate copolymers typically are derived from acidic monomers comprising about 2% by weight to about 30% by weight, preferably about 2% by weight to about 15% by weight, of a copolymerizable acidic monomer.

In some embodiments, the copolymer of the high Tg polymer additive typically has an weight average molecular weight greater than 100,000. Higher molecular weight high Tg polymer is desirable because it enhances the thermal stability of the compatibilized blend, especially at elevated temperatures and extreme conditions. To utilize a high molecular weight high Tg polymer additive, other attributes of the high Tg polymer additive (such as monomer selection) and of the compatiblized blend (such as acid-base interaction level) are varied to retain compatability.

Acidic Monomers

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof.

Due to their availability, acidic monomers of the present invention are typically the ethylenically unsaturated carboxylic acids. When even stronger acids are desired, acidic monomers include the ethylenically unsaturated sulfonic acids and ethylenically unsaturated phosphonic acids. Sulfonic and phosphonic acids generally provide a stronger interaction with a basic polymer. This stronger interaction can lead to greater improvements in cohesive strength, as well as higher temperature resistance and solvent resistance of the adhesive.

Basic Monomers

A wide variety of basic monomers are useful in the present invention. In some embodiments, the basic monomer is a nitrogen-containing monomer, such as those of Formula (I):

Formula (I)

wherein
a is 0 or 1;
$R_1$, $R_2$, and $R_3$ are independently selected from H— and $CH_3$— or other alkyl group,
X is selected from an ester or amide group; and
Y is an alkyl group, a nitrogen-containing aromatic, nitrogen-containing group, such as the group:

wherein
Z is a divalent linking group (typically about 1 to 5 carbon atoms);
b is 0 or 1; and
$R_4$ and $R_5$ are selected from hydrogen, alkyl, aryl, cycloalkyl, and arenyl groups.

$R_4$ and $R_5$ in the above group may also form a heterocycle. In all embodiments, Y, $R^1$, and $R^2$ may also comprise heteroatoms, such as O, S, N, etc. While Formula I summarizes the majority of basic monomers useful in the present invention, other nitrogen-containing monomers are possible if they meet the definition of a basic monomer (i.e., can be titrated with an acid).

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, N-vinyl formamide, (meth)acrylamide, and mixtures thereof.

High Tg Monomers

High Tg monomers are generally those monoethylenically unsaturated monomers which as homopolymers have a glass transition temperature (Tg) greater than about 20° C. Preferably, the high Tg polymer is derived from monoethylenically unsaturated monomers, which as homopolymers have a Tg of greater than 20° C. Typically the high Tg polymer is independently derived from monoethylenically unsaturated monomers selected from the group consisting of (meth)acrylate esters of non-tertiary alkyl alcohols, the alkyl groups of which comprise from about 1 to about 20, preferably about 1 to about 18 carbon atoms as shown in Formula II (below); acidic or basic monomers as defined above; vinyl-terminated monomers; and combinations thereof.

In most embodiments, the high Tg polymers are independently derived from (meth)acrylate monomers, although, for certain formulations, vinyl-terminated monomers, such as styrene, may show comparable or superior results. Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, bromoethyl methacrylate, 2-hydroxyethyl methacrylate, hydroxypropyl methacrylate, glycidyl methacrylate, ally methacrylate, styrene, vinyl acetate, vinyl chloride.

(Meth)acrylate Monomers (Meth)acrylate copolymers useful in the invention contain at least one monofunctional unsaturated monomer selected from the group consisting of (meth)acrylate esters of non-tertiary alkyl alcohols, the alkyl groups of which comprise from about 1 to about 20, preferably about 1 to about 18 carbon atoms, such as those of Formula (II):

Formula (II)

wherein $R^1$ is H or $CH_3$, the latter corresponding to where the (meth)acrylate monomer is a methacrylate monomer, and $R^2$ is a linear, branched, aromatic, or cyclic hydrocarbon group. When $R^2$ is a hydrocarbon group, it can also include heteroatoms (e.g., oxygen or sulfur). Criteria to consider when selecting $R^2$ include cost and the form in which the copolymer will be incorporated into the adhesive.

Examples of suitable (meth)acrylate monomers useful in the present invention include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl. methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

Vinyl Monomers

When used, vinyl monomers useful in the acidic and basic copolymers include vinyl esters (e.g., vinyl acetate), styrene, substituted styrene (e.g., a-methyl styrene), vinyl halide, vinyl propionate, and mixtures thereof. Other useful vinyl monomers include macromeric (meth)acrylates such as (meth)acrylate-terminated styrene oligomers and (meth)

acrylate-terminated polyethers, such as are described in PCT Patent Application WO 84/03837 and European Patent Application EP 140941.

Polymerization Methods

The polymers herein can be prepared by any conventional free radical polymerization method, including solution, radiation, bulk, dispersion, emulsion, and suspension processes. In one solution polymerization method, the monomers, along with a suitable inert organic solvent, are charged into a four-neck reaction vessel that is equipped with a stirrer, a thermometer, a condenser, an addition funnel, and a thermowatch.

A concentrated thermal free radical initiator solution is added to the addition funnel. The whole reaction vessel, addition funnel, and their contents are then purged with nitrogen to create an inert atmosphere. Once purged, the solution within the vessel is heated to an appropriate temperature to activate the free radical initiator to be added, the initiator is added, and the mixture is stirred during the course of the reaction. A 98% to 99% conversion can typically be obtained in about 20 hours.

Bulk polymerization methods, such as the continuous free radical polymerization method described by Kotnour et al. in U.S. Pat. Nos. 4,619,979 and 4,843,134; the essentially adiabatic polymerization methods using a batch reactor described by Ellis in U.S. Pat. No. 5,637,646; suspension polymerization processes described by Young et al. in U.S. Pat. No. 4,833,179; and, the methods described for polymerizing packaged pre-adhesive compositions described by Hamer et al. in PCT Publication No. WO 97/33945 may also be utilized to prepare the polymers.

Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful according to the invention include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl)oxime. For both thermal- and radiation-induced polymerizations, the initiator is present in an amount of about 0.05% to about 5.0% by weight based upon the total weight of the monomers.

While solventless embodiments are visualized within the scope of this invention it is preferred that solvents are used in preparing the adhesive compositions of the invention. Suitable solvent, if desired, may be any liquid which is sufficiently inert to the reactants and product such that it will not otherwise adversely affect the reaction. Such solvents include ethyl acetate, acetone, methyl ethyl ketones, and mixtures thereof. Representative solvents include acetone, methylethyl-ketone, heptane, and toluene. If used, the amount of solvent is generally about 30-80% by weight based on the total weight of the reactants (monomer and initiator) and solvent. The solvent is optionally removed from the polymers prior to blending.

Chain transfer agents can also be utilized when polymerizing the polymers described herein to control the molecular weight of the polymers. Suitable chain transfer agents include halogenated hydrocarbons (e.g., carbon tetrabromide) and sulfur compounds (e.g., lauryl mercaptan, butyl mercaptan, ethanethiol, and 2-mercaptoether).

The amount of chain transfer agent that is useful depends upon the desired molecular weight and the type of chain transfer agent. Organic solvents (e.g., toluene, isopropanol, and ethyl acetate) can also be used as chain transfer agents, but they generally are not as active as, for example, sulfur compounds. The chain transfer agent is typically used in amounts from about 0.001 parts to about 10 parts; more often, 0.01 to about 0.5 parts; and specifically from about 0.02 parts to about 0.20 parts based on total weight of the monomers.

Crosslinkers. In order to increase cohesive strength of the coated adhesive composition, a crosslinking additive is incorporated into the blend. Two types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (Bisamide). Such chemical crosslinkers can be added into the solvent-based PSA after polymerization and activated by heat during oven drying of the coated adhesive. Isocyanate and epoxy crosslinkers can also be used.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide reagent.

The second type of chemical crosslinker is a photosensitive crosslinker which is activated by high intensity ultraviolet (UV) light. Two common photosensitive crosslinkers used are benzophenone and copolymerizable aromatic ketone monomers as described in U.S. Pat. No. 4,737,559. Another photocrosslinker, which can be post-added to the solution composition and activated by UV light is a triazine, for example, 2,4-bis(trichloromethyl)-6-(4-methoxy-pheynl)-s-triazine. These crosslinkers are activated by UV light generated from artificial sources such as medium pressure mercury lamps or a UV blacklight.

Hydrolyzable, free-radically copolymerizable crosslinkers, such as monoethylenic ally unsaturated mono-, di-, and trialkoxy silane compounds including, but not limited to, methacryloxypropyltrimethoxysilane (available from Gelest, Inc., Tullytown, Pa.), vinyldimethylethoxysilane, vinylmethyl diethoxysilane, vinyltriethoxysilane, vinyltrimethoxysilane, vinyltriphenoxysilane, and the like, are also useful crosslinking agents. Multi-functional acrylates are useful for bulk or emulsion polymerization. Examples of useful multifunctional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof. Crosslinking may also be achieved using high energy electromagnetic radiation such as gamma or e-beam radiation.

The amount and identity of crosslinker is tailored depending upon application of the adhesive composition. Typically, the crosslinker is present in amounts less than 5 parts based on total dry weight of adhesive composition. More specifically, the crosslinker is present in amounts from 0.01 pats to 1 part based on total dry weight of the adhesive composition.

Additives. Following copolymerization, other additives may be added with the resultant adhesive blend composition provided the additive causes no adverse affect to the desired properties, such as optical clarity and environmental stability over time. For example, compatible tackifiers and/or plasticizers may be added to aid in optimizing the ultimate tack and peel properties of the PSA. The use of such tack-modifiers is common in the art, as is described in the Handbook of Pressure Sensitive Adhesive Technology, edited by Donatas Satas (1982). Examples of useful tackifiers include, but are not limited to, rosin, rosin derivatives, polyterpene resins, coumarone-indene resins, and the like. Plasticizers which may be added to the adhesive of the invention may be selected from a wide variety of commercially available materials. In each case, the added plasticizer must be compatible with the PSA. Representative plasticizers include polyoxyethylene aryl ether, dialkyl adipate, 2-ethylhexyl diphenyl phosphate, t-butylphenyl diphenyl phosphate, 2-ethylhexyl adipate, toluenesulfonamide. dipropylene glycol dibenzoate, polyethylene glycol dibenzoate, polyoxypropylene aryl ether, dibutoxyethoxyethyl formal, and dibutoxyethoxyethyl adipate. UV stabilizers as known in the art may also be added.

The adhesive composition can preferably be optically transmissive, e.g., optically clear. Optical clarity allows the adhesive to be used in preparing optical elements. The adhesive can also maintain optical clarity, e.g., transmissivity, for a useful period of time under normal use conditions and as shown by accelerated aging tests. A balance of desired clarity, stability, bond strength, integrity, etc., can be achieved in an adhesive by selection of the combination of ingredients of the adhesive. Additional ingredients can be selected to balance properties of clarity, bond strength, integrity, stability, etc., as will be appreciated.

Preparation of the Compatabilized Adhesive Blend

The composition of the present invention includes a PSA component and a high Tg polymer in an adhesive composition in any relative amounts that, in combination with the crosslinker and any other optional components, will result in a useful balance of properties of the adhesive, preferably meaning at least an optically clear, stable adhesive.

For the PSA component, an amount is included to provide the functional properties of a pressure sensitive adhesive, including a useful amount of tack or tackiness and other PSA properties. These and other properties of pressure sensitive adhesives, and the amounts necessary to achieve these properties, are well understood by those skilled in the art.

For the high Tg polymer, any amount can be included to provide sufficient stability and clarity, in a given application. Preferably, an amount of high Tg polymer can be included to maintain optical clarity of the adhesive during use and over time, under conditions that would be experienced by the adhesive or a product that incorporates the adhesive. In particular, the amount of high Tg polymer can provide a bond that does not delaminate or bubble over time, under a variety of environmental conditions. The required bond strength will depend on the materials being bonded, but preferred amounts of high Tg polymer can provide adhesives according to the invention that will not bubble or delaminate over time when used to bond an outgassing material to a low moisture vapor transfer material.

Overall, the PSA component and high Tg polymer can be included in the adhesive composition in relative amounts that will provide a desired combination of pressure sensitive adhesive properties, adhesive bond properties, and optical clarity, with stability of these properties and clarity over time during use. In general, depending on factors such as the chemical identities and molecular weights, amount of cross-linking, etc., among other variables, less than about 50 parts by weight high Tg polymer based on 100 parts by weight total PSA component and high Tg polymer can provide a compatibilized adhesive composition that will have acceptable optical clarity. Exemplary embodiments include amounts less than about 30 parts by weight high Tg polymer based on one hundred parts by weight total PSA component and high Tg polymer. At the low end, an amount of high Tg polymer useful to provide sufficient bond properties can depend on factors such as the type of high Tg polymer and PSA polymer, but in general, useful amounts can be from at least about 5 parts by weight high Tg polymer based on 100 parts by weight total high Tg polymer and PSA component. In most embodiments, the range of the two components can be from about 10 to about 30 parts by weight high Tg polymer based on a total of one hundred parts by weight high Tg polymer and PSA component.

The pressure sensitive adhesive component and high Tg polymer additive can be blended by traditional methods known to those skilled in the art. Such methods include mixing, mechanical rolling, hot melt blending, etc. Typically, the pressure sensitive adhesive component and the high Tg polymer additive are mixed in solution.

Application of the Compatibilized Adhesive Blend

The adhesive compositions may be applied by any conventional application method, including but not limited to gravure coating, curtain coating, slot coating, spin coating, screen coating, transfer coating, brush or roller coating, and the like. The thickness of a coated adhesive layer, typically in the form of a liquid is in part dependent on the nature of the materials used and the specific properties desired, but those properties and the relationship of thickness to the properties is well understood in the art. Exemplary thicknesses of an adhesive layer may be in the range from about 0.05 to about 100 micrometers.

Exemplary embodiments involve coating the adhesive composition in a solvent. In alternative embodiments, copolymers are hot-melt coatable, followed by subsequent cross-linking.

The adhesive composition is preferably optically clear. Optical clarity can be measured in the number of different ways, as will be appreciated by the skilled artisan, but for the purposes of this disclosure optical clarity can be observed visually and optionally measured according to ASTM-D 1003-95. When so measured, adhesives according to the invention can exhibit a luminous transmission of at least about 90%, and haze of less than about 2%.

Because a preferred property of the adhesive composition is to avoid contributing to any loss of luminous transmission of a multi-layer article, e.g., a laminate, compared to the elements without the adhesive present, when the luminous transmission is measured for a laminate, the transmission can be recorded using the most transmissive substrate as a reference. For example for a glass/adhesive/film laminate, glass can be used as the reference (i.e., the transmission through the glass can be set as 100% transmission) and the percent transmission of the laminate can be relative to that of glass alone.

Exemplary adhesives can maintain useful optical transmissivity over a useful life of the adhesive, and can also maintain a secure bond strength and resist or avoid delamination or bubbling to maintain optical clarity between elements of a multilayer product, over a useful life. Such stability and retention of optical transmissivity can be measured by accelerated aging tests, whereby samples of adhesive optionally bonded to one or two other materials are exposed to elevated temperature, optionally with elevated humidity conditions, for a period of time. Adhesives of the invention can retain their optical clarity after such accelerated aging tests as follows: after aging an adhesive composition at 90° C. for approximately 500 hours in an oven for accelerated aging, the aged adhesive is translucent, e.g. optically clear and the luminous transmission of the aged adhesive can be greater than 90%, and the haze of the aged adhesive can be less than 2%. The humidity of the 90° C. oven is not controlled, and is ambient for an oven in an inside space; at 90° C. the relative humidity can generally be below 10 or 20%.

In exemplary embodiments, the adhesive compositions of the present invention can retain their optical clarity such that after aging an adhesive composition at 80° C. and 90% relative humidity in an oven with temperature and humidity control for approximately 500 hours, the aged adhesive is translucent, e.g., optically clear. In addition, the luminous transmission of the aged adhesive can be greater than 90%, and the haze less than 2%.

The adhesive, being optically clear, can be useful in bonding together components of a variety of optical components, optical elements, and optical products. More generally, the adhesive can be useful in bonding together any type of product, and is particularly useful if the product requires or benefits from an optically transmissive, preferably optically clear, adhesive.

Optical elements include articles and products that have an optical effect or optical application, such as screens for computers or other displays; components of such screens such as polarizing layers, reflective layers, selectively reflective layers such as infrared reflecting optically clear layers; coatings for windows which may polarize or reflect; other partially or fully reflective optically transmissive products, etc.

Examples of optical elements include optical elements wherein an adhesive is used to bond together one or more different layers of optical materials, typically layers or films that are at least partially optically transmissive, reflective, polarizing, or optically clear. Optical elements typically include a number of different substrate layers, which can be any one or more of polymeric, glass, metal or metallized polymer, or of the present adhesive or another adhesive, e.g., another pressure sensitive or structural adhesive. Any one or more of these materials may also provide a desired physical property including flexibility, rigidity, strength, or support, or can be one or more of reflective, partially-reflective, antireflective, polarizing, selectively transmissive or reflective with respect to different wavelengths, and is typically sufficiently optically transmissive to function within an optical element. Such layers can be prepared from well known optical materials including materials that are polymeric, glass, or metallic, and also from layers of adhesives. Any one or more of these materials or layers may be a fragile layer, an outgassing layer, or a low moisture vapor transfer layer (see below).

Examples of rigid substrates that can be included to provide support for an optical element include glass or rigid polymeric materials such as polycarbonates, polyacrylates, polyesters, etc. Often, such rigid polymeric materials, especially when relatively thick (for example in the range of millimeters or centimeters, as opposed to smaller dimensions), can exhibit a property of outgassing. This is a well-known and frustrating problem in optical products and optical elements. This outgassing problem can be exacerbated if the outgassing layer is bonded to a layer that does not allow the gas to pass through, but acts as a barrier to the gas, resulting in the gas collecting at the adhesive interface and causing bubbling or delamination, reduced bond strength, or loss of clarity. Adhesives of the invention offer improved bond strength and stability and can therefore reduce or eliminate such bubbling or delamination even where the adhesive is used to bond an outgassing substrate to a low moisture vapor transfer layer.

Specific examples of outgassing substrate layers include polycarbonates, such as polycarbonates having a thickness in the range from about one or three millimeters up to any larger thickness; and polyacrylates such as polymethyl methacrylate, for example having a thickness of at least amount one to three millimeters up to any larger thickness.

Materials considered to have low moisture vapor transmission rates are also known and understood and include certain chemistries and constructions of films, including polymeric films that may or may not include certain coatings that can effectively act as barriers to moisture vapor. The threshold level of moisture vapor transmissivity that can cause delamination, bubbling, loss of bond strength, or loss of clarity in a specific optical product construction can depend on various factors such as the composition of an outgassing substrate layer and the amount of gas it produces, conditions of use, and the composition and overall strength, integrity, and stability of an adhesive.

Other polymers or polymeric materials may be used in an optical element to provide, e.g., mechanical properties, conductivity, and optical functionalities such as diffusion, color. Examples of polymeric materials include, but are not limited to plastic films such as polypropylene, polyethylene, polyvinyl chloride, polyester (polyethylene tereplithalate), polyurethane, cellulose acetate, cellulose triacetate, ethyl cellulose, diffuse film, metallized polymeric film and ceramic sheet materials, and other optical film such as view angle compensation film. More specific examples include multilayer AR (antireflective) film such as described in U.S. Pat. No. 6,277,485 columns 13 and 14, the entire disclosure of the patent being incorporated herein by reference; and microlayer films such as those described in U.S. Pat. No. 6,049,419 (the entire disclosure of which is incorporated herein by reference), any of which can be reflective, partially reflective, or otherwise optically useful.

Figure 1:
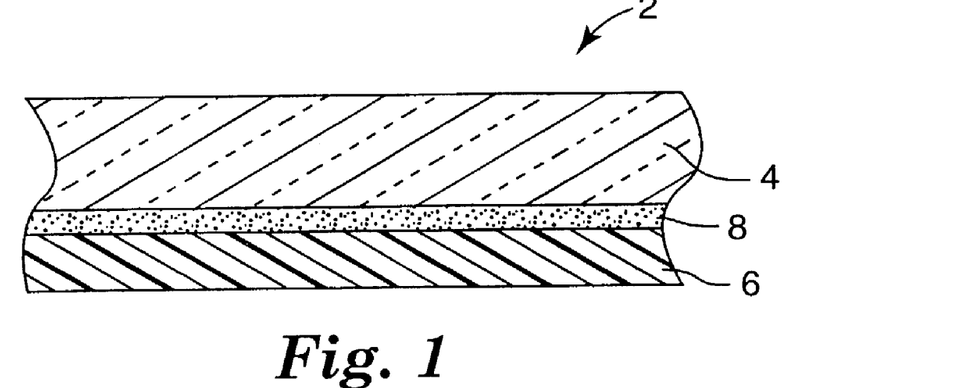
FIG. 1 illustrates an embodiment of an optical element according to the invention, comprising an outgassing layer and a low moisture vapor transfer layer.
Figure 2:
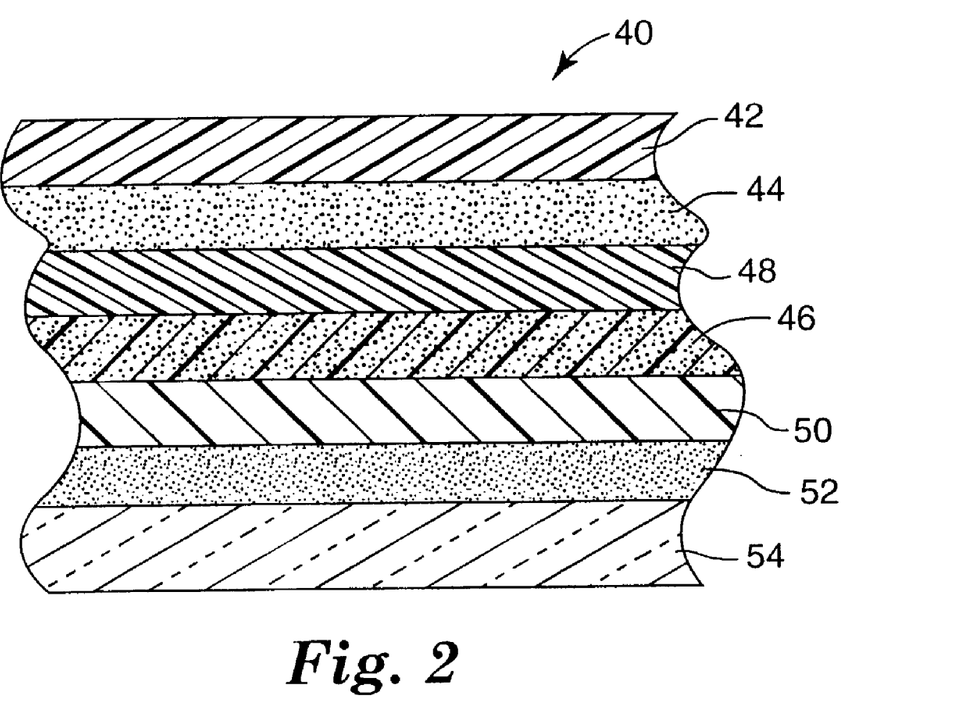
FIG. 2 illustrates an embodiment of a polarizing optical element according to the present invention.

The invention contemplates the use of the described adhesive to bond any of the above-described or other outgassing substrate materials to any of the above-described or other substrate materials, including low moisture vapor transfer materials, preferably to create an optically clear and environmentally stable bond within an optically transmissive multi-layer article. Below are described, as illustrated in FIGS. 1 and 2, exemplary embodiments of multi-layer, optical products prepared according to the present invention. These embodiments are illustrative of the larger invention described herein of using the described adhesive for any application, but especially where optical clarity is desired.

FIG. 1 illustrates an embodiment of an optical element according to the invention, comprising a low moisture vapor transmissive film bonded using the adhesive to an outgassing layer. Referring to the figure, optical element 2 includes outgassing layer 4 bonded to low moisture vapor transmissive film 6 using optically transmissive adhesive 8 comprising as described herein. The outgassing layer 4 can be any outgassing substrate, as described above or otherwise, such as a rigid polycarbonate or polyacrylate, and the low moisture vapor transmissive film can be any such film as described above or otherwise. Outgassing layer 4 may be 4.4 millimeter thick polycarbonate or 3.0 mm thick acrylic, and low moisture vapor transmissive film 6 can be an AR Film. Alternatively, low moisture vapor transmissive film 6 may be an IR film (i.e., an infrared reflecting film such as solar reflecting film), such as a microlayer film having selective transmissivity such as an optically clear but infrared reflecting film as described in U.S. Pat. No. 5,360,659, the entire disclosure of which is incorporated herein by reference.

FIG. 2 illustrates another embodiment of a polarizing optical element according to the invention. FIG. 2 shows polarizing optical element 40 that includes PET layer 42, adhesive layers 44, 46 and 52, polarizing layer 48, PC retarder layer 50, and LCD glass layer 54. At least one of, and optionally all of adhesive layers 44, 46, and 52 is the adhesive composition as described herein, or may be a different pressure sensitive or structural adhesive.

The invention further relates to methods of using the adhesive compositions, for example by dispensing the adhesive onto a substrate layer, and optionally contacting the adhesive with another material, such as a different layer of a multi-layer article. Exemplary steps of inventive methods may include placement of the adhesive onto a substrate such as a release liner or optical film; and optional drying of an optional solvent in the adhesive or polymerization of (meth)acrylate components; or other steps, techniques, or methods known to be used in the preparation of multi-layer articles using an adhesive.

Adhesives as described herein can, in an important embodiment of the invention, be used in methods typically understood to be useful for preparing optically clear components and optical elements. Exemplary methods of preparing optical elements include, among others, those identified in U.S. Pat. Nos. 5,897,727, 5,858,624, and 6,180,200, each of which is incorporated herein by reference. The adhesive composition is typically in the form of a liquid that can be coated or applied by methods generally useful with liquid pressure sensitive adhesives, e.g., coated onto a release liner. If solvent is used, solvent can later be removed from the coated adhesive. An example of a useful next step would be to transfer the coated adhesive onto a substrate, typically with lamination.

Exemplary release liners are well known and commercially available, and include paper and film liners coated with release agents such as silicones, fluorocarbons, etc. such as the T-30 liner available from CP Film, Martinsville, Va.

In some embodiments of the invention, the adhesive-bearing substrate can then be contacted with another material for bonding. This step can be accomplished by lamination or otherwise.

EXAMPLES

These examples are merely for illustrative purposes only and are not meant to be limiting on the scope of the appended claims. All parts, percentages, ratios, etc. in the examples and the rest of the specification are by weight unless indicated otherwise. Unless otherwise noted, materials were obtained from Aldrich Chemicals, Milwaukee, Wis.

Table of Abbreviations

| Trade Designation or Other Abbreviation | Description |
|---|---|
| AA | Acrylic Acid |
| BA | n-butyl acrylate |
| Bisamide Crosslinker | 1,1'-(1,3-phenylene dicarbonyl)-bis-(2-methylaziridine) |
| BMA | n-butyl methacrylate |
| DMAEMA | (N,N-dimethylamino)ethyl methacrylate |
| Glass Microscope Slide | 75 millimeter × 50 millileter × 1 millimeter Corning No. 2947 MicroSlides commercially available from Corning Glass Works; Corning, NY |
| IOA | Iso-octyl acrylate |
| MA | Methyl acrylate |
| MMA | Methyl methacrylate |
| NNDMA | N,N-dimethyl acrylamide |
| HEA | Hydroxy ethyl acrylate |
| BOSCODUR 16 crosslinker | An isocyanate crosslinker commercially available from Bostik Co. |
| PC plate | 4.4 millimeter thick LEXAN polycarbonate plate commercially available from General Electric, Schenectady, NY |
| PMMA plate | Optix acrylic plate of 3.0 millimeter thick polymethyl methacrylate commercially available from Plaskolite, Inc, Columbus, OH |
| SRF | Solar Reflecting Film, multilayer IR reflecting film, which comprises alternating layers of Polyethylene terephthalate (A-layer) and co-Polymethylmethacrylate (B-layer). These layers are arranged in 6 layer optical repeat units 7A, 1B, 1A, 7B, 1A, 1B with 96 such optical repeat units for a total of 576 layers. This film reflects light in the infrared wavelength region between about 900-1300 nm while allowing light transmission in the visible between 380-770 nm. |
| VAZO-67 Initiator | 2,2'-azobis-(2-methylbutyronitrile), an initiator commercially available from E.I. duPont de Nemours & Co.; Wilmington, DE. |

Preparation of Polymer Additive 1

In a glass reaction vessel were placed VAZO-67 Initiator (0.3 g), MMA (70 g), BMA (25 g), DMAEMA (5 g), and ethyl acetate (150 g). The resulting solution was degassed with nitrogen for 15 minutes, and the vessel was sealed and spun in a 65° C. water bath for 24 hours to yield a viscous solution (40 wt % solids). The polymer thus obtained had a weight average molecular weight of 210,000 and the calculated Tg shown in Table 1.

Preparation of Polymer Additive 2

The same procedure and conditions as in the Preparation of Polymer Additive 1 was used except VAZO-67 Initiator (1 g) and was used and the reaction was carried out at 60° C. with 30 wt % solids. The polymer thus obtained had a weight average molecular weight of 115,000 and the calculated Tg shown in Table 1.

Preparation of Polymer Additive 3

The same procedure and conditions as in the Preparation of Polymer Additive 2 was used except additionally isooctyl thioglycolate (1 g) was added. The polymer thus obtained had a weight average molecular weight of 27,400 and the calculated Tg shown in Table 1.

Preparation of Polymer Additive 4

The same procedure and conditions as in the Preparation of Polymer Additive 2 was used except monomers were IOA (5 g), MMA (90 g), and DMAEMA (5 g). The polymer thus obtained had a weight average molecular weight of 104,000 and the calculated Tg shown in Table 1.

Preparation of Polymer Additive 5

The same procedure and conditions as in the Preparation of Polymer Additive 2 was used except monomers were IOA (25 g), MMA (70 g), and DMAEMA (5 g). The polymer thus obtained had a weight average molecular weight of 104,000 and the calculated Tg shown in Table 1.

Preparation of Polymer Additive 6

The same procedure and conditions as in the Preparation of Polymer Additive 2 was used except monomers were IOA (45 g), MMA (50 g), and DMAEMA (5 g). The polymer thus obtained had a weight average molecular weight of 107,000 and the calculated Tg shown in Table 1.

Preparation of Polymer Additive 7

The same procedure and conditions as in the Preparation of Polymer Additive 2 was used except monomers were IOA (95 g) and DMAEMA (5 g). The polymer thus obtained had a weight average molecular weight of 130,000 and the calculated Tg shown in Table 1.

Preparation of Polymer Additive 8

The same procedure and conditions as in the Preparation of Polymer Additive 2 was used except monomers were MMA (80 g) and NNDMA (20 g). The polymer thus obtained had a weight average molecular weight of 85,600 and the calculated Tg shown in Table 1.

Preparation of Polymer Additive 9

The same procedure and conditions as in the Preparation of Polymer Additive 2 was used except monomers were MMA (85 g) and NNDMA (15 g). The polymer thus obtained had a weight average molecular weight of 74,700 and the calculated Tg shown in Table 1.

Preparation of Polymer Additive 10

The same procedure and conditions as in the Preparation of Polymer Additive 2 was used except monomers were MMA (90 g) and NNDMA (10 g). The polymer thus obtained had a weight average molecular weight of 85,700 and the calculated Tg shown in Table 1.

Preparation of Polymer Additive 11

In a glass reaction vessel were placed VAZO-67 Initiator (0.3 g), MMA (42 g), BMA (15 g), AA (3 g), and ethyl acetate (140 g). The resulting solution was degassed with nitrogen for 15 minutes, and the vessel was sealed and spun in a 58° C. water bath for 24 hours to yield a viscous solution (30 wt % solids). The polymer thus obtained had a weight average molecular weight of 164,000 and the calculated Tg shown in Table 1.

TABLE 1

| Sample | Composition | $M_{w,SEC}$ | $T_{g,Cal}$ (° C.) |
|---|---|---|---|
| Polymer Additive 1 | MMA/BMA/DMAEMA (70/20/5) | 210,000 | 76 |
| Polymer Additive 2 | MMA/BMA/DMAEMA (70/20/5) | 115,000 | 76 |
| Polymer Additive 3 | MMA/BMA/DMAEMA (70/20/5) | 27,400 | 76 |
| Polymer Additive 4 | MMA/IOA/DMAEMA (90/5/5) | 104,000 | 87 |
| Polymer Additive 5 | MMA/IOA/DMAEMA (70/25/5) | 104,000 | 43 |
| Polymer Additive 6 | MMA/IOA/DMAEMA (45/50/5) | 107,000 | 8 |
| Polymer Additive 7 | IOA/DMAEMA (95/5) | 130,000 | −52 |
| Polymer Additive 8 | MMA/NNDMA (80/20) | 85,600 | 101 |
| Preparation Additive 9 | MMA/NNDMA (85/15) | 74,700 | 102 |
| Polymer Additive 10 | MMA/NNDMA (90/10) | 85,700 | 103 |
| Polymer Additive 11 | MMA/BMA/AA (70/25/5) | 164,000 | 79 |

$M_{w,SEC}$ = Weight average molecular weight as measured by size exclusion chromatography (SEC). SEC measurement was carried out using a Waters 712 WISP autosampler, 1515 HPLC pump, 2410 differential detector, and the following Waters columns: Styragel HR 5E and Styragel HR 1. All samples were run in THF at 35° C. with a flow rate of 1.0 mL/min. Linear polystyrene standards were used for calibration.
$T_{g,Cal}$ = Calculated $T_g$ based on the Fox equation, assuming $T_{g,MMA}$ = 378° K, $T_{g,BMA}$ = 293° K, $T_{g,DMAEMA}$ = 298° K, and $T_{g,NNDMA}$ = 362° K, and $T_{g,AA}$ = 378° K.

Preparation of PSA 1

In a glass reaction vessel were placed VAZO-67 Initiator (0.15 g), IOA (93 g), AA (7 g), and ethyl acetate (186 g). The resulting solution was degassed with nitrogen for 30 minutes, and the vessel was sealed and spun in a 60° C. water bath for 24 hours to yield a viscous solution (35 wt % solids). The viscous solution was further diluted with toluene to 25 wt % solids. The polymer thus obtained had a weight average molecular weight of 491,000.

Preparation of PSA 2

The same procedure and conditions as in the Preparation of PSA 1 was used except monomers were IOA (57.5 g), MA (35 g), and AA (7.5 g). The polymer thus obtained had a weight average molecular weight of 557,000.

Preparation of PSA 3

In a glass reaction vessel were placed VAZO-67 Initiator (0.12 g), BA (49.8 g), NNDMA (9.0 g), HEA (1.2 g) and ethyl acetate (140 g). The resulting solution was degassed with nitrogen for 30 minutes, and the vessel was sealed and spun in a 58° C. water bath for 24 hours to yield a viscous solution (30 wt % solids). The polymer thus obtained had a weight average molecular weight of 694,300.

TABLE 2

| Sample | Composition | $M_{w,SEC}$ |
|---|---|---|
| PSA 1 | IOA/AA (93/7) | 491,000 |
| PSA 2 | IOA/MA/AA (57.5/35/7.5) | 557,000 |
| PSA 3 | BA/NNDMA/HEA (83/15/2) | 694,300 |

Example 1

An adhesive film was prepared by adding 15 parts of solids Polymer Additive 1 to 85 parts of solids PSA 1, and further adding 0.10 part by solids of bisamide as a crosslinking agent, coating the mixture onto a SRF film having a thickness of 50 μm so that the adhesive layer had a thickness of 25 μm. After heat drying in a 70° C. oven for 10 minutes, the adhesive film was covered with a silicone-coated release liner. Samples of the coated film were then laminated to PMMA and PC plates. Additionally a sample of the mixture of PSA 1, Polymer Additive 1, and bisamide crosslinker was coated onto a silicone-coated release liner, heat dried in a 70° C. oven for 10 minutes to give a adhesive layer thickness of 25 μm. This adhesive film was laminated to a Glass Microscope Slide, the release liner was removed and the optical transmission and haze were measured using a TCS Plus Spectrophotometer model 8870 commercially available from BYK Gardner, Inc.; Silver Springs, Md. according to the ASTM Test Method D 1003-95 ("Standard Test for Haze and Luminous Transmittance of Transparent Plastic"). The Luminous Transmittance was 92.8% and the Haze was 0.7%.

Example 2

Samples were prepared in the same manner as in Example 1, except 0.05 part of bisamide as a crosslinking agent was added.

Example 3

Samples were prepared in the same manner as in Example 1, except 15 parts of Polymer Additive 2 was added to 85 parts of PSA 1.

Example 4

Samples were prepared in the same manner as in Example 1, except 15 parts of Polymer Additive 4 was added to 85 parts of PSA 2.

Example 5

Samples were prepared in the same manner as in Example 1, except 15 parts of Polymer Additive 5 was added to 85 parts of PSA 2.

Example 6

Samples were prepared in the same manner as in Example 1, except 15 parts of Polymer Additive 8 was added to 85 parts of PSA 2.

Example 7

Samples were prepared in the same manner as in Example 1, except 15 parts of Polymer Additive 9 was added to 85 parts of PSA 2.

Example 8

Samples were prepared in the same manner as in Example 1, except 15 parts of Polymer Additive 10 was added to 85 parts of PSA 2.

Example 9

Samples were prepared in the same manner as in Example 1, except 15 parts of Polymer Additive 11 was added to 85 parts of PSA 3, and 0.4 parts of a crosslinker Boscodur 16 was used instead of Bisamide crosslinker.

Comparative Example 1

Samples were prepared in the same manner as in Example 1, except no bisamide as a crosslinking agent was added.

Comparative Example 2

Samples were prepared in the same manner as in Example 1, except 15 parts of Polymer Additive 3 was added to 85 parts of PSA 1.

Comparative Example 3

Samples were prepared in the same manner as in Example 1, except 15 parts of Polymer Additive 6 was added to 85 parts of PSA 2.

Comparative Example 4

Samples were prepared in the same manner as in Example 1, except 15 parts of Polymer Additive 7 was added to 85 parts of PSA 2.

TABLE 3

| Sample | Additive | Additive $M_{w,SEC}$ | Additive $T_{g,Cal}$ (°C.) | PSA | Crosslinker Amount |
|---|---|---|---|---|---|
| Example 1 | MMA/BMA/DMAEMA (70/25/5) | 210,000 | 76 | IOA/AA (93/7) | 0.10% |
| Example 2 | MMA/BMA/DMAEMA (70/25/5) | 210,000 | 76 | IOA/AA (93/7) | 0.05% |
| Example 3 | MMA/BMA/DMAEMA (70/25/5) | 115,000 | 76 | IOA/AA (93/7) | 0.10% |
| Example 4 | MMA/IOA/DMAEMA (90/5/5) | 104,000 | 87 | IOA/MA/AA (57.5/35/7.5) | 0.10% |
| Example 5 | MMA/IOA/DMAEMA (70/25/5) | 104,000 | 43 | IOA/MA/AA (57.5/35/7.5) | 0.10% |
| Example 6 | MMA/NNDMA (80/20) | 85,600 | 101 | IOA/MA/AA (57.5/35/7.5) | 0.10% |
| Example 7 | MMA/NNDMA (85/15) | 74,700 | 102 | IOA/MA/AA (57.5/35/7.5) | 0.10% |
| Example 8 | MMA/NNDMA (90/10) | 85,700 | 103 | IOA/MA/AA (57.5/35/7.5) | 0.10% |
| Example 9 | MA/BMA/AA (70/25/5) | 164,000 | 79 | BA/NNDMA/HEA (83/15/2) | 0.40% |
| Comp. Example 1 | MMA/BMA/DMAEMA (70/25/5) | 210,000 | 76 | IOA/AA (93/7) | 0.00% |
| Comp. Example 2 | MMA/BMA/DMAEMA (70/25/5) | 27,400 | 76 | IOA/AA (93/7) | 0.10% |
| Comp. Example 3 | MMA/IOA/DMAEMA (45/50/5) | 107,000 | 8 | IOA/MA/AA (57.5/35/7.5) | 0.10% |
| Comp. Example 4 | IOA/DMAEMA (95/5) | 130,000 | −52 | IOA/MA/AA (57.5/35/7.5) | 0.10% |

Testing Example 1

Several different accelerated aging protocols have been used for testing the aging properties of laminate structures. One protocol is carried out by placing the laminate in a 90° C. oven for a week and is called the "90° C.". Another is carried out by placing the laminate in an over with controlled humidity at 80° C. and 90% relative humidity for a week and is called the "80° C., 90% RH". The results of all testing protocols are determined by visual observation to determine whether the optical properties of the sample are maintained. The data are reported as either "Pass" if the sample retains its optical clarity, "Bubbles" if bubbles (0.2 mm-5 mm in size) are present, and "Blisters" for the presence of large bubbles (>5 mm in size) upon post aging examination. The test results are summarized in Table 4 below.

TABLE 4

| Sample | PMMA Laminate | | PC Laminate | |
|---|---|---|---|---|
| | 90° C. | 80° C., 90% RH | 90° C. | 80° C., 90% RH |
| Example 1 | Pass | Pass | Pass | Pass |
| Example 2 | Pass | Pass | Pass | Pass |
| Comp. Example 1 | Blisters | Blisters | Blisters | Blisters |
| Example 3 | Pass | Pass | Pass | Pass |
| Comp. Example 2 | Blisters | Blisters | Blisters | Blisters |
| Example 4 | Pass | Pass | Pass | Pass |
| Example 5 | Pass | Pass | Pass | Pass |
| Comp. Example 3 | Bubbles | Bubbles | Bubbles | Bubbles |
| Comp. Example 4 | Blisters | Blisters | Blisters | Blisters |
| Example 6 | Pass | Pass | Pass | Pass |
| Example 7 | Pass | Pass | Pass | Pass |
| Example 8 | Pass | Pass | Pass | Pass |
| Example 9 | Pass | Pass | NT | NT |

NT = not tested

What is claimed is:

1. An adhesive composition comprising a blend of:
   a majority of a pressure sensitive adhesive component comprising at least one polymer with an acid functionality, wherein the pressure sensitive adhesive is formed from alkyl (meth)acrylate monomers having an alkyl group comprising from 4 to 12 carbon atoms,
   a high Tg polymer with a glass transition temperature greater than 20° C. and a weight average molecular weight greater than 100,000 wherein the high Tg polymer is a basic copolymer, and wherein the high Tg polymer comprises a copolymer formed from methyl methacrylate, butyl methacrylate, and dimethylamino ethylmethacrylate; and
   a crosslinker;
   wherein the functionality of the pressure sensitive adhesive component and the functionality of the high Tg polymer form an acid-base interaction when mixed, and after aging at 80° C. and 90% relative humidity for 500 hours, the composition is optically clear on visual observation so that the composition exhibits a luminous transmission of at least about 90% and a haze of less than about 2% when measured according to ASTM-D 1003-95.

2. The adhesive composition of claim 1, wherein the high Tg polymer has a glass transition temperature greater than 50° C.

3. The adhesive composition of claim 2 wherein the pressure sensitive adhesive component is present in an amount ranging from about 70 to 90 percent by weight, and the high Tg polymer is present in an amount ranging from about 10 to 30 percent by weight based on a total weight of the pressure sensitive adhesive component and the high Tg polymer.

4. The adhesive composition of claim 3 comprising an activatable crosslinker, said activatable crosslinker being capable of being activated by heat or light and being selected from the group consisting of multifunctional aziridine, benzophenones, triazines, monoethylenically unsaturated mono-, di-, and trialkoxy silane compounds, diacrylates, triacrylates, and tetraacrylates, isocyanates, epoxies, and mixtures thereof.

5. The adhesive composition of claim 4 comprising a multifunctional aziridine crosslinker.

6. The adhesive composition of claim 5 wherein the multifunctional aziridine crosslinker comprises 1,1'-(1,3-phenylene dicarboxyl)-bis-(2-methylaziridine).

7. The adhesive composition of claim 6 wherein the pressure sensitive adhesive component comprises a copolymer with an weight average molecular weight less than 800,000.

8. The adhesive composition of claim 1 wherein the adhesive composition is a pressure sensitive adhesive.

9. An article comprising the adhesive composition of claim 1 coated on at least one surface of a substrate.

10. The article of claim 9 wherein the substrate is selected from the group consisting of a release liner, a film, and a rigid material.

11. A multi-layer assembly comprising the adhesive composition of claim 1;
   wherein the adhesive composition is optically clear, and wherein the adhesive composition bonds at least two layers together comprising a low moisture vapor transfer layer and an outgassing layer, said outgassing layer comprising a material selected from the group consisting of a polycarbonate and a poly(methyl methacrylate), and said low moisture vapor transfer layer being selected from the group consisting of a metallized polymeric film, an infrared reflecting film, a multilayer optical film, and a polymeric film layer coated with a conductive layer, and
   wherein after aging at 80° C. and 90% relative humidity for 500 hours, the bond between the outgassing layer and the low moisture vapor transfer layer does not delaminate or bubble, and the composition remains optically clear so that the composition exhibits a luminous transmission of at least about 90% and a haze of less than about 2% when measured according to ASTM-D 1003-95.

12. The multilayer assembly of claim 11 wherein the assembly comprises a conductive optical element comprising a rigid polycarbonate layer adhered with the adhesive to a surface of a polymeric film layer, an opposite surface of the polymeric film layer being coated with a conductive layer.

13. The multi-layer assembly of claim 11 comprising an activatable crosslinker, said activatable crosslinker being capable of being activated by heat or light and being selected from the group consisting of multifunctional aziridine, benzophenones, triazines, monoethylenically unsaturated mono-, di-, and trialkoxy silane compounds, diacrylates, triacrylates, and tetraacrylates, isocyanates, epoxies, and mixtures thereof.

14. The adhesive composition of claim 1 wherein the pressure sensitive adhesive component is present in an amount ranging from about 70 to 90 percent by weight, and the high Tg polymer is present in an amount ranging from about 10 to 30 percent by weight based on a total weight of the pressure sensitive adhesive component and the high Tg polymer.

15. The adhesive composition of claim 14 wherein the pressure sensitive adhesive component is formed from (i) isooctyl acrylate monomer and acrylic acid monomer.

16. The adhesive composition of claim 15 wherein the crosslinker comprises 1,1'-(1,3-phenylene dicarboxyl)-bis-(2-methylaziridine).

17. The adhesive composition of claim 14 wherein the pressure sensitive adhesive component comprises a copolymer with an weight average molecular weight less than 800,000.

18. The adhesive composition of claim 17 wherein the pressure sensitive adhesive component comprises a copolymer with an weight average molecular weight less than 600,000.

* * * * *